(12) United States Patent
Ramadei et al.

(10) Patent No.: US 6,907,545 B2
(45) Date of Patent: Jun. 14, 2005

(54) SYSTEM AND METHOD FOR RECOGNIZING FAULTS IN MACHINES

(75) Inventors: Michael J. Ramadei, Trumbull, CT (US); David L. Rich, Shelton, CT (US); Gary S. Jacobson, Norwalk, CT (US)

(73) Assignee: Pitney Bowes Inc., Stamford, CT (US)

( * ) Notice: Subject to any disclaimer, the term of this patent is extended or adjusted under 35 U.S.C. 154(b) by 611 days.

(21) Appl. No.: 09/752,068

(22) Filed: Mar. 2, 2001

(65) Prior Publication Data

US 2002/0166082 A1 Nov. 7, 2002

(51) Int. Cl.[7] .............................................. G06F 11/00
(52) U.S. Cl. ........................... 714/25; 714/26; 714/37; 706/45; 706/46; 706/47; 706/53
(58) Field of Search ............................ 714/25, 26, 37; 706/45–48, 53–55

(56) References Cited

U.S. PATENT DOCUMENTS

| 5,515,503 | A | | 5/1996 | Shimomura et al. | |
|---|---|---|---|---|---|
| 5,522,014 | A | * | 5/1996 | Clark et al. | 706/45 |
| 5,581,694 | A | * | 12/1996 | Iverson et al. | 714/26 |
| 5,596,712 | A | * | 1/1997 | Tsuyama et al. | 714/26 |
| 5,680,541 | A | | 10/1997 | Kurosu et al. | |
| 5,903,453 | A | * | 5/1999 | Stoddard II | 700/79 |
| 5,956,352 | A | * | 9/1999 | Tatosian et al. | 714/773 |
| 6,249,755 | B1 | | 6/2001 | Yemini et al. | |
| 6,373,383 | B1 | * | 4/2002 | Arrowsmith et al. | 340/506 |
| 6,634,000 | B1 | * | 10/2003 | Jammu et al. | 714/37 |
| 6,662,189 | B2 | * | 12/2003 | Oyanagi et al. | 707/102 |
| 6,715,107 | B2 | * | 3/2004 | Beer et al. | 714/37 |
| 2002/0083371 | A1 | * | 6/2002 | Ramanathan et al. | 714/37 |
| 2003/0135786 | A1 | * | 7/2003 | Vollmar et al. | 714/25 |

* cited by examiner

*Primary Examiner*—Robert Beausoliel
*Assistant Examiner*—Michael Maskulinski
(74) *Attorney, Agent, or Firm*—Christopher J. Capelli; Angelo N. Chaclas

(57) ABSTRACT

A system and method for diagnosing one or more faults or one or more potential faults in a machine. The system and method has a communications module for communicating machine data between the machine and the system. It also has a fault recognition module for analyzing the machine data, which can determine one or more faults or potential faults in the machine. An expert system module having a fault tree is guided through only a truncated portion of the fault tree based upon output from the fault recognition module.

3 Claims, 3 Drawing Sheets

SYSTEM AND METHOD FOR RECOGNIZING FAULTS IN MACHINES

BACKGROUND OF THE INVENTION

The invention relates to recognizing faults in machines. More particularly, the invention relates to a system and method for recognizing potential faults and actual faults in machines from machine data.

Faults in electrical, mechanical and electromechanical machines are often detected by sensors, which measure the machines' performance. For example, as material is transported through a machine it may be expected to cross the path of a sensor within a certain time expectation. Often, expectations like this are not achieved, particularly when a machine is starting to fail or has failed. Expert systems are often employed to simulate the judgment of a human operator (e.g. a repair technician who must diagnose specific machine faults). Characteristically, an expert system contains a knowledge base having accumulated experiences for applying the knowledge base to each particular machine fault. The knowledge base is usually represented by a fault tree, which is used to guide an operator to a specific fault, and thus a solution for repairing the machine. When there is a machine fault, the operator, using the expert system, accesses the fault tree and proceeds down the tree through question and answer sessions presented to the operator. This is typically a manual process where the operator is presented with a series of questions, and depending upon the operator's answers, the expert system presents other related question, which steps the operator down a specific path in the fault tree. Essentially, the expert system guides the operator down the fault tree, where he or she ultimately reaches a point in the tree where information regarding the specific fault of the machine is provided. Having this information, the operator can isolate the problem area of the machine and address the necessary repair.

A problem with the above expert system approach to diagnosing a fault within a machine is that most machines have numerous modules or subsystems, any of which could house the fault. If the operator is unsure of which module or subsystem has failed, the operator must start at the top of the fault tree and work his or her way down the tree until the fault is isolated. This procedure is very time consuming and increases the down time of the machine, as well as the chances of misdiagnosis. If the operator is savvy, then he or she may jump to a particular subsystem (or subtree) within the fault tree and bypass preliminary diagnosis procedures. This saves operator time, but only if the operator is correct in his or her preliminary diagnosis of the fault. If the operator is incorrect, then the expert system will take him or her down an incorrect path of the fault tree. Additionally, if the machine has different operators, then each operator is likely to respond differently to a fault, which would result in different fault response times. Moreover, since this process has significant operator involvement, it lends itself to operator error. Even if the operator cautiously steps through the fault tree, he or she could incorrectly assess the machine information or incorrectly answers a question presented by the expert system and indirectly proceed down an incorrect path of the fault tree. What is needed is a system and method that uses machine data to recognize potential or actual faults and guide a conventional expert system through a diagnosis process, thereby increasing the speed and accuracy of a diagnosis and repair of the machine, and minimizing time consuming human interaction and assorted error.

SUMMARY OF THE INVENTION

Deficiencies in the prior art are overcome, and an advance in the art is achieved with a system for diagnosing at least one potential or actual fault one or more potential faults in a machine. The system has a communications module for communicating machine data between the machine and the system. It also has a fault recognition module for analyzing the machine data, which can determine at least one potential or actual fault in the machine. An expert system module having a fault tree is guided through the fault tree at a location other than the starting point of the fault tree by the determination of at least one potential or actual faults by the fault recognition module.

Operationally, the system diagnoses one or more faults or one or more potential faults in a machine. This diagnosis is achieved by analyzing data from the machine to determine a fault indicia for at least one potential or actual fault, and by applying the fault indicia to a fault tree having a starting point and being representative of the machine, the fault indicia being applied at a location other than the starting point of the fault tree to determine a diagnostic path within the fault tree.

DETAILED DESCRIPTION

Figure 1:
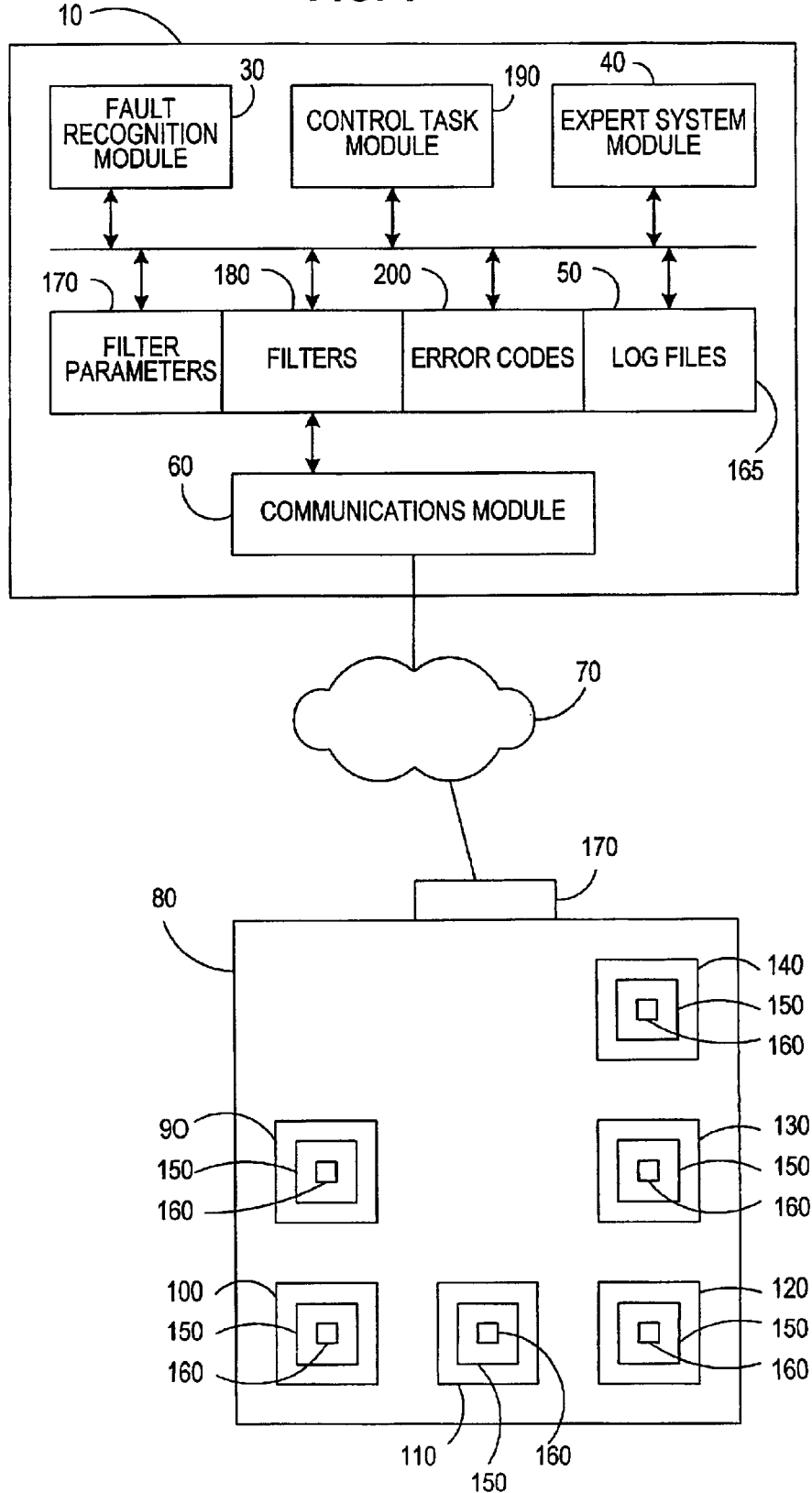
FIG. 1 depicts a high level block diagram of an illustrative arrangement of the hardware components of the present invention.

FIG. 1 shows components of a diagnostic system 10, which incorporates an embodiment of a fault recognition module 30 of the present invention. Diagnostic system 10 is a general purpose computer that includes a communications module 60, a database 50, an expert system module 40, and fault recognition module 30. Diagnostic system 10 is connected to a machine 80 via network 70. It should be realized that system 10 can provide services concurrently to many machines, such as element 80.

Diagnostic system 10 may be, for example, a general purpose computer having a processor, memory, communication busses, Microsoft Windows™ operating system and a user interface such as a mouse, keyboard and monitor. The user interface provides an operator the functionality to interface with and control various modules within system 10. In the present embodiment, the user interface also includes a commercially available Internet browser, such as Netscape Communicator 4.7 provided by Netscape Communications Corporation. The interface also provides the operator the ability to view machine data (for example log files) and information provided by fault recognition module 30 and expert system module 40.

Database 50 is a conventional relational database—for example, Microsoft Access—that provides the functionality of storing and reading data in table format, querying the data, creating forms (e.g. logs), creating reports and macros, to name only a few functions. Generally, the database contains a look-up table and data related to sensor 160 information from machine 80 acquired by controllers 150, for example error codes, which are described in more detail below. Database 50 resides in memory of diagnostic system 10 and is coupled to the other modules 30, 40 and 60 by communication busses within the general purpose computer, which makes up the platform supporting diagnostic system 10.

Communications module 60 provides two-way communications between diagnostic system 10 and machine 80. Module 60 includes a conventional data transfer software module that connects system 10 to network 70 using the protocols employed on the Internet, such as Transmission Control Protocol/Internet Protocol (TCP/IP), Point-to-Point Protocol (PPP), and File Transfer Protocol (FTP). It should be noted, however, that there are various communication protocols suitable for the purpose of this invention, and various connection configurations, such as a direct serial connection between diagnostic system 10 and machine 80.

For purposes of this illustration, machine 80 is an electromechanical mail machine having one or more electromechanical modules 90–140, such as a paper feeder module 90, a scanner module 100, a sealer module 110, a twister module 120, a folder module 130, and inserter modules 140, to name a few. It will be understood that machine 80 can be practically any type of device having mechanical, electrical, and/or electromechanical components subject to error or fault, and that the description of machine 80 as an electromechanical mail machine is for illustrative purposes only. Included in modules 90–140 are embedded controllers 150 that not only maintain control of the above listed modules, but also monitor and log the operation of the modules 90–140. The controllers 150 include sensors 160 in each module 90–140 that detect paper jams, successful mailpiece pass through, and job performance, for example. The sensors 160 thus detect the performance of the modules 90–140, and the embedded controllers 150 store the modules' performance as log files 165. Preferably, log file 165 tabulate error codes 200 received from embedded controllers 150. Log files 165 are subsequently transferred to database 50 via network 70 and communications module 60. The log files 165 comprise various types of information, such as frequency of failures and other performance data. The log files 165 may be structured as tables, which contain information that can be used to determine how various modules within machine 80 are performing. It should be realized that without any analysis of the data, the log data alone is too voluminous and vague for an operator to use to quickly and accurately determine faults, without any analysis of the data. Additionally, this data, as received from machine 80, does not suggest a reason for a module failing, such as a reason why there is an increase in paper jams, or recoverable faults. A recoverable fault is a condition where the machine detects an abnormality and is able to recover without operator intervention. It can be a mechanism retry or it can be diverting a flawed piece that is sensed (e.g. an envelope that does not open its flap).

Machine 80 also has a communications module 170 for interfacing with diagnostic system 10, so that sensor 160 information and embedded controller 150 commands can be exchanged between the two elements. The communications module is connected to network 70, and uses communications protocols TCP/IP, PPP, and FTP to communicate with diagnostic system 10.

Filter parameters 170 are used to construct filters 180, where the parameters correlate to various machine and module behavioral patterns or signatures. For example, a filter 180 may represent one or more parameters 170 which may represent a potential or actual fault, such as a particular jam pattern or a signature measured by a sensor 160 of a paper feeder module 90. As discussed in more detail below, filters 180 and filter parameters 170 are determined by one or more individuals (filter designer). who are familiar with the operation and performance expectations of machine 80 and its internal modules. Typically, filter parameters 170 are unique to each type of module 90–140 and are structured to note any deviations from a known performance requirement (e.g. data pattern) of a module 90–140, or structured to reflect performance observations (e.g. data patterns) that are known to lead to a module failure. Filter parameters 170 are stored in database 50, accessed by fault recognition module 30, and constructed into filters 180, where filters 180 look for potential or actual fault patterns when log files 165 from machine 80 are parsed. For this illustration, if filters 180 detect a potential or actual fault, fault recognition module 30 sends a "Fail" result to expert system module 40. If filters 180 do not detect a potential or actual fault, fault recognition module 30 sends a "Pass" result to expert system module 40. It should be realized that by including additional filters and parameters, the "Pass" and "Fail" results can be extended to include a fuzzy logic analysis having multiple degrees of "Pass" and "Fail".

Figures 2, 3:
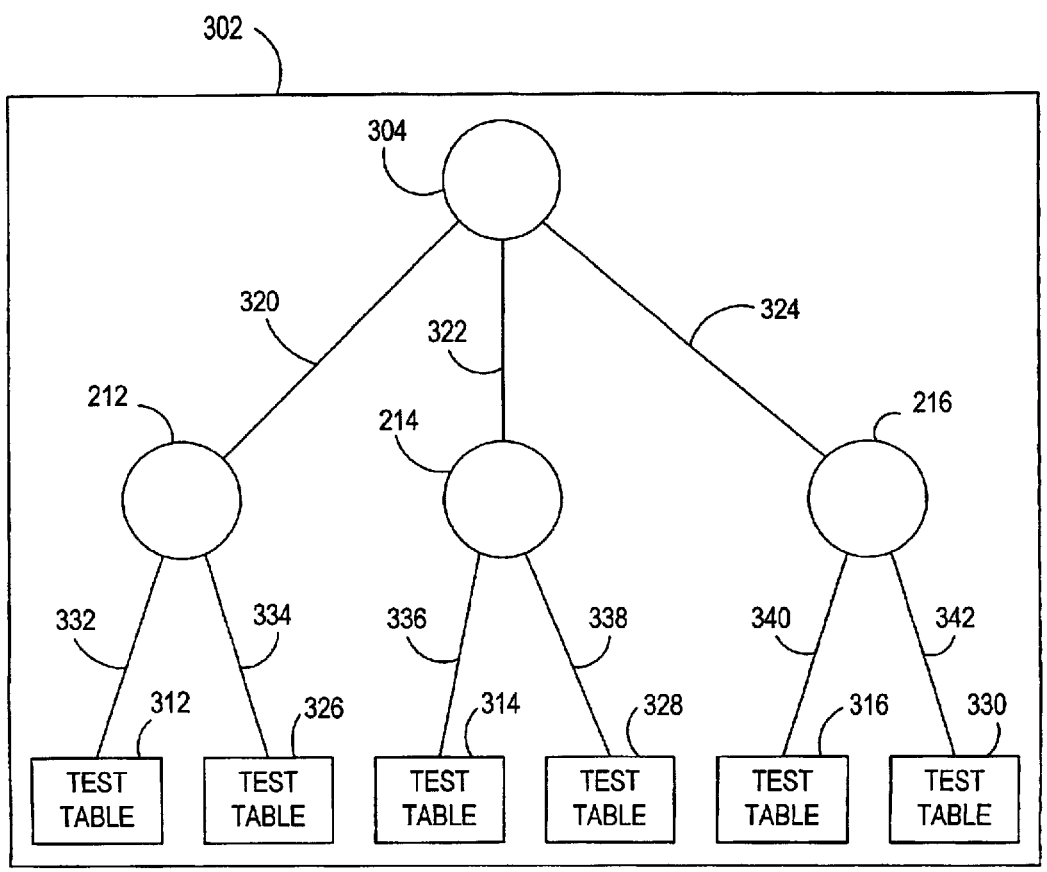
FIG. 2 is an illustrative presentation of a look up table.
FIG. 3 is an illustrative presentation of a fault tree.

Referring to FIG. 2, look-up table 202 is a cross references of filters 204–208 with decision points 212–216. Decision points 212–216 are points within a fault tree 302, of FIG. 3, that require either a manual answer by an operator or an answer by fault recognition module 30, such as the "Pass" and "Fail" answers described above. Error codes 200, of FIG. 1, represent particular faults in machine 80. For example, when a particular module 90–140 of machine 80 fails, it generates an error code 200. This error code 200 can represent a particular type of fault or potential fault and is recorded in the log file 165. Filters 204–208, shown in FIG. 2, are designed to recognize this specific error code 200 and can determine from the log file 165 that a particular fault has occurred. The decision points 212–216 are points in the fault tree 302, of FIG. 3, where expert system module 40 requests guidance from fault recognition module 30 as to which branch 332–342 to go down. The filters 180 are constructed from one or more filter parameters 170 or error codes 200, which represents one or more potential or actual faults. The look-up table 202 of FIG. 2, has one column that lists the filters 204–208 and a second column that lists corresponding decision points 212–216 (of fault tree 302). When expert system module 40 traverses fault tree 302 and comes to a decision point 212–216 that requires an automatic answer, rather than an operator's answer to a question, expert system 40 accesses look-up table 202 and cross references the appropriate decision points 212–216 to the appropriate filters 204–208. The decision points are predetermined by the filter designer to call one or more particular filters.

Expert system module 40 and fault recognition module 30 both reside in program memory within the general-purpose computer, of diagnostic system 10, and are able to share resources, information, and computational results with each other. Fault recognition module 30 analyzes the log files 165 of FIG. 2. The results of this analysis are used to guide expert system module 40 through a traversal of a fault tree 302, which is described in conjunction with FIG. 3. Advantageously, this guidance provides expert system 40 with the capability to skip one or more branches 332–334 of the fault tree 302 that are not related to the specific fault in machine 80, and leads directly to the one relevant branch of branches 332–342. Accordingly, this results in an efficient traversal of the fault tree 302. Prior to this invention, the guidance down the fault tree was a manual process. A fault tree 302 is a structure that logically corresponds to the hardware organization of a machine under test. In addition to the previously mentioned diagnostic starting points, A, B, and C, the fault tree 302 can have nodes 212–216 that correspond to the modules 90–140 within the machine 80. To illustrate, a fault tree 302 for machine 80 is stored in memory and can include at the top of the tree, three branches 320–324 leading to three different nodes 212–216 (which represent different modules, such as feeder 90, twister 120, scanner 100). At each node 212–216 branches 332–342 extend to test tables 312–316 and 326–330 for each module 90, 100 or 120. Obviously, the combinations of the fault tree 302 are vast and typically represent a particular diagnosis procedure selected and designed by a fault system designer.

As mentioned above, memory within the general purpose computer of diagnostic system 10 stores fault tree 302, by which causes of faults are searched for to effect the diagnosis of machine 80. Each node 212–216 in the fault tree corresponds to a hardware/machine module 90–140, which in turn has hardware sub-modules of the machine under test. Once the expert system module 40 has been guided as far as possible through the fault tree 302, by fault recognition module 30, the operator interface directs the operator to provide further input on the fault state, or provides the operator the necessary repair procedures. Expert system module 40 can be, for example, TestBench software program manufactured by Carnegie Group.

Fault recognition module 30 determines faults and potential faults of machine 80 and its modules within. Fault recognition module 30 analyzes information from machine 80 for patterns in the information that match or do not match one or more filters 180 or error codes 200. To illustrate, log files 165 generated by machine 80 and its modules are transferred to diagnostic system 10, via network 70, and stored in database 50. Using filters 180, fault recognition module 30 parses log files 165 in database 50 to determine if any fault patterns exists in log files 165. Fault recognition module 30 also parses log files 165 to determines if any error codes 200 are within the log files 165, which would indicate one or more actual faults. Filters 180 are constructed from filter parameters 170 and/or error codes 200, which are also stored in database 50. Filters 180 represent actual and/or potential fault patterns, and/or error codes. Module 30 produces a result file delineating which filters 180 (which represent fault patterns) and error codes 200 (which represent faults) were found and a degree of importance/relevance.

When expert system module 40 comes to a node 212–216, for example node 212, expert system module 40 access look-up table 202 and cross references node 212, in relational database 50, to corresponding filter 204. As mentioned earlier, the look up table 202 is structured so that each filter 180 can be cross-referenced with its decision point 212–216 on fault tree 302 and vise versa. When a fault, potential fault, and/or error code is detected, fault recognition module 30 sends a "Pass" or "Fail" result to expert system 40, which guides module 40 to the appropriate branch 332–342 in fault tree 302. Alternatively, decision points 212–216 can be presented to the operator via the user interface. With this information the operator can access expert system module 40, via the user interface, and guide the expert system module 40 to the appropriate starting point of the fault tree.

Fault recognition module 30 parses log files 165 and determines whether a jam pattern signature is present in the log files 165 of a particular module 90–140 of machine 80. Fault recognition module 30 signals to expert system module 40 that a jam has occurred in a particular module 90–140, and expert system module 40 responds by jumping to an appropriate branch 332–342 in the fault tree 302 that represents the particular module 90–140 of machine 80 under test. Advantageously, expert system module 40 is guided directly to a specific branch 332–342 of the fault tree related to the jam signature, thus saving time of manually traversing branches of the fault tree that lead up to the branch specified by fault recognition module 30. This also reduces operator error because the jam pattern is recognized by fault recognition module 30, rather than by the operator, and fault recognition module 30 directs expert system module 40 through the fault tree 302.

As mentioned earlier, the filter parameters 170 and filters 180 are determined by a filter designer who is familiar with the operation and performance expectations of machine 80 and its internal modules 90–140. These filters 180 and parameters 170 are typically unique to each type of module 90–140 because in most cases each module 90–140 performs a different function, and is therefore subject to different performance criteria. Since each module 90–140 is expected to perform within certain design criteria, the filters 180 and parameters 170 are structured to note any deviations from this expectation, or structured to reflect performance observations that are known to lead to a module failure. For example, a paper feeder module 90 is designed to feed paper every 3 seconds and sensors 160 with embedded controllers 150 are located throughout paper feed module 90 to measure this performance requirement and log the performance. It should be realized that each machine 80 and each module 90–140 may log the machine/module data differently from other machines/modules. This is in part because each module 90–140 is typically measuring different information, and also because different manufacturers of machine 80 may not log information using the same standard. Thus, depending upon the machine module 90–140 and manufacturer, it should be realized that the log files 165 can be of various formats and can contain various types of information, yet be used to determine the same machine/module faults or potential faults. An example of a log file 165 with various types of information for a paper feeder module 90 having a 3 second performance expectation, is shown below:

| Paper | A<br>Time (sec.) | OR | B<br>Time (sec.) |
|---|---|---|---|
| First | 3 | | 0 |
| Second | 3 | | 0 |
| Third | 2.7 | | −0.3 |

Depending upon the content of the log file 165 (type of information), the filter designer can design a filter 180 that can detect a deviation from a 3 second paper feed, or that can detect a deviation from 0 seconds, and come to the same conclusion. In the above example, a filter 180 compares in column A the time log data to a "3" and flags any data that does not equal a "3", or the filter 180 can, in column B, compare the log data to a "0" and flag any data that does not equal "0".

In a slightly more complicated filter 180, the filter designer can design a filter 180 for paper feed module 90 whereby if the sensor 160 detects that paper is being fed every 5 seconds for a total time of 30 seconds, then the paper feeder is starting to malfunction. Filters like this and others can be used singularly or in combination with other filters 180 to determine faults or predict potential faults.

In an example of jam pattern parameters, the parameters can range from simple repeats of the same type of jam fault to more sophisticated patterns that check inter-module jam activity. Simple-repeats isolate to a specific mechanical module 90–140 or section of a module (i.e. entrance or exit area). Inter-module jam activity suggests faults originating in one module 90–140, but paper getting stuck downstream in another module 90–140. Advantageously, sophisticated inter-module checks prevent an operator from initially diagnosing a fault in the wrong downstream module 90–140, which significantly improves the troubleshooting time.

Accordingly, having the functionality to create and use various types of single and combined filters 180 makes it possible to cover a very broad range of fault scenarios, and thus decrease fault diagnosis time and costs. In the context of machine 80 (mail machine), these fault scenarios are often repeated patterns of jams, or specific combinations of jams, which are indicative of an underlying fault in the machine 80 that may be consistent or intermittent in nature. Consistent jams can often be diagnosed by knowing which portion of a fault tree 302 to reach, and thus will require relatively simple pattern recognition to locate that pattern of fault tree 302. Intermittent jams may occur often enough to indicate a problem exists, but not often enough to perhaps flag the operator (e.g. service representative) which troubleshooting procedure to use. Thus, the operator needs additional help to effectively guide expert system module 40 to the proper diagnostic starting point 306–310 of the fault tree 302.

Each filter 180 can be constructed as a table having parameters that instruct fault recognition module 30 to validate that a log file 165 has or has not achieved certain requirements. Some example requirements are: minimum number of occurrences over a certain number of cycles, that the occurrences happen a minimum number of cycles apart, and that weight is given to the most recent occurrences in the log file 165.

Additionally, filters 180 can be constructed from individual error codes 200 or combinations of error codes 200 for use in determining fault pattern signatures. The error codes 200 represent particular faults within machine 80. These error codes 200 can be combined with each other using logical functions, such as AND, OR and NOT to construct more complicated filters 180 capable of detecting more complicated fault patterns. For example, jam codes XX, BB, and KK can be combined in a function XX AND KK NOT BB. This filter is capable of detecting XX and NOT BB.

To further illustrate, various filters 180 for modules 90–140 within the mail machine are described. Filter 180A, looks for repeated back-to-back faults in a sealer module 110, where paper will normally lodge and appear to be cleared out when a jam is removed. Filter 180A uses filter parameters that have a minimum distance of 0, and 2 occurrences to indicate a fault.

Filter 180B, also looks for repeated jams, but needs 7 occurrences over 3 cycles to indicate a fault. The increased number of occurrences typically implies a broken part or major paper path problem in the respective area, which, in this example, is a folder exit area.

Filter 180C, is designed for determining intermittent faults. This requires 2 occurrences out of 100 cycles, but the occurrences must be a minimum of 3 cycles apart. Filter 180C detects problems with fold skew in a folder module 130.

Filter 180D, is an inter-module filter, which takes a broad look at a jam history across several modules. In this example, combinations of jams, either (Sealer Exit AND Inserter Exit) OR (Sealer Exit AND Folder Exit) will imply that there is paper physically stuck in the sealer module 110, but is actually being damaged upstream in an inserter module 140 or folder module 130.

Using filter 180D, fault recognition module 30 the provides expert system module 40 a precedence order of tests to evaluate the most complicated possibilities first (the sealer module 110 interior), then will evaluate sealer entrance or exit-intermittent faults, followed by the repeated faults, such as paper left in sealer, or the folder-exit-repeated filter 180B mentioned above. These precedence filters, such as filter 180D, provide tie-breaking when several possible filters 180 generated positive results.

Thus, back-to-back filters 180 for repeated jams can have high occurrence rates to avoid false triggers, and can suggest either paper left behind between sensors 160 in some of the modules 90–140 where paper typically becomes jammed, or a part breakage. Intermittent jam filters 180 can be constructed to look at the relative occurrence rate over a longer period of time, i.e. 100 cycles or last 200 cycles. Intermittent problems can leave subtle jam patterns that are not easily recognized by humans or appear to be random. As mentioned earlier, specific filters 180 can be constructed to recognize many of these types of fault patterns and at a minimum, guide expert system module 40 through the correct decision point 212–216 of the fault tree 302 for further analysis of the fault.

The following discussion discloses an operational schema where diagnostic system 10 receives information from machine 80 and processes the information to determine faults and potential faults, and effectively guides expert system 40 through decision points 212–216 on fault tree 302. Generally speaking, in accordance with the principles of this invention, the information is preprocessed to identify one or more faults, or one or more potential faults within machine 80.

Figure 4:
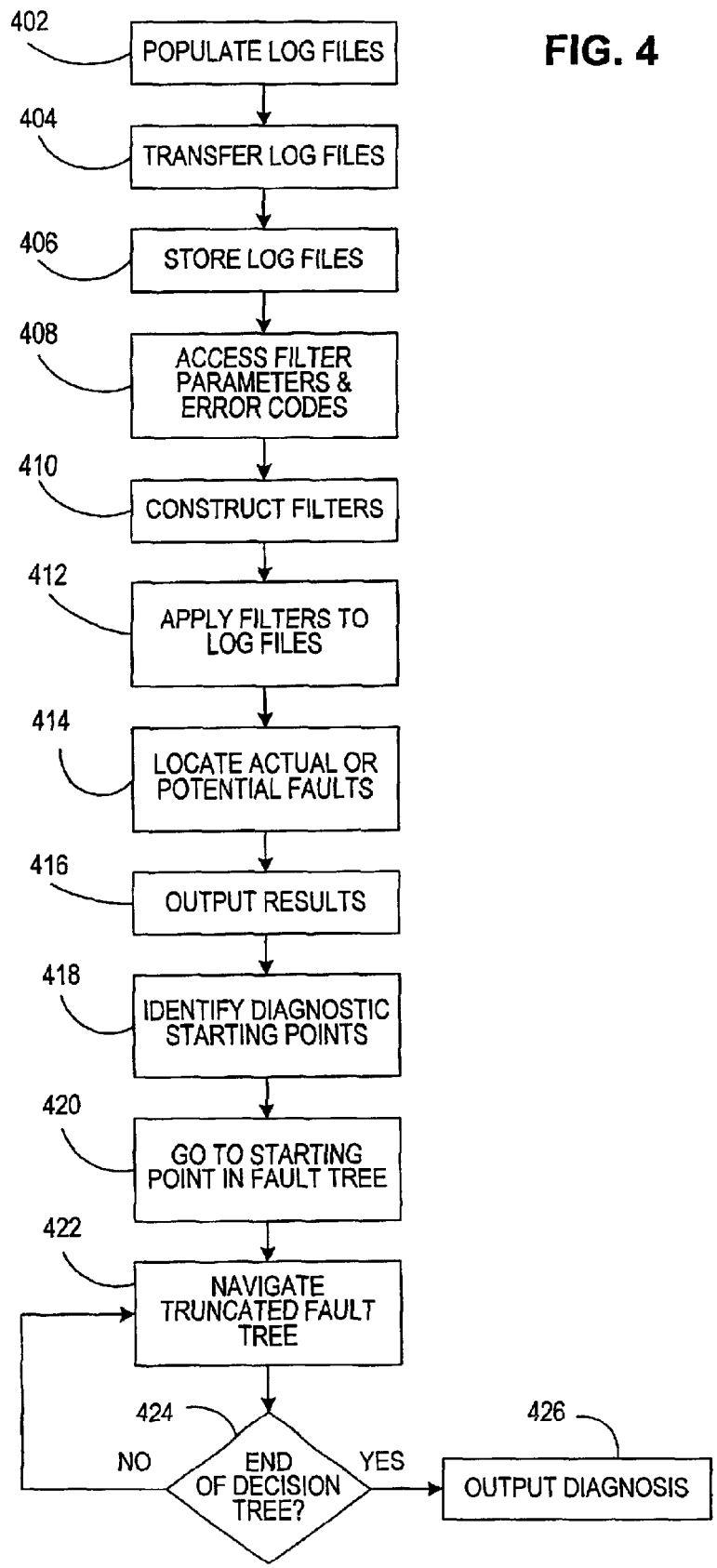
FIG. 4 is a flowchart depicting a process that is implemented by diagnosis system 10.

The process that is carried out in diagnostic system 10 is presented in FIG. 4. At block 402 log files 165, which represent activity reports for the various modules 90–140 within machine 80, are created by controllers 150 in response to input from sensors 160. At block 404, log files 165 from machine 80 is received by diagnostic system 10 through communications module 60, via network 70. As mentioned earlier, the type of communications protocol and means used to communicate this information between machine 80 and diagnostic system 10 are flexible, so long as the two elements are using identical protocols and the throughput is sufficient for the intended use. At block 406 the log files 165 are stored in database 50.

At blocks 408–412, fault recognition module 30 performs analysis of the log files 165 to determine potential and/or actual machine fault or faults. At block 408, fault recognition module 30 accesses filter parameters 170 and error codes 200 stored in the memory, to construct filters 180 as defined by the filter designer. Alternatively, using the user interface, the operator can select and construct the type of filters 180 to use. At block 410 filters 180 are constructed from filter parameters 170 of block 408 that are based upon performance expectations and error codes 200 of the various modules 90–140 being monitored and tested. At block 412, once the filters 180 are constructed, the log files 165 in database 50 are accessed and passed through the filters 180. The log files 165 are data files compiled by embedded controllers 150 in machine 80. These log files 165 represent the activity and performance of the modules 90–140 within machine 80, as detected by the sensors 160. It should be realized that these log files 165, their format, and the means by which they are compiled, are not limited to the disclosure as described herein. At block 414, as the log files 165 are passed through the filters 180, the filters 180 locate faults or potential fault patterns that appear in the log files 165, which reflect actual or potential faults in machine 80. These patterns have been predetermined to indicate various types of machine faults or potential faults. Advantageously, fault recognition and fault diagnostics are improved because the log files 165 (machine-logged data) are interpreted by fault recognition module 30, rather than through human perception of what faults may or may not be occurring.

At block 416 the results of the fault recognition of block 414 are outputted to expert system module 40, which will perform fault diagnostics on machine 80. Thus, decision points 212–216 in the fault tree 302 are located at block 418. At block 420, diagnostic testing by expert system 40 is initiated to decision point 306–310 of fault tree 302. At block 422, expert system module 40 navigates the now truncated fault tree based on operator answers to questions from expert system module 40. This question/answer process of block 422 continues until, at decision block 424, the answer to the query "End of decision tree" is "Yes". If the answer to the query of decision block 424 is "No", the program loops back to block 422. If the answer is "Yes", the program proceeds to block 426 where the solution necessary to correct the fault is outputted to the operator. Accordingly, using these results to guide expert system module 40 through its diagnostic process results in improved speed and accuracy of the diagnostic process. Expert system module 40 receives the results from fault recognition module 30, is initialized to a specific branch 332–342 of decision points 212–216 of its fault tree 302 and then is "guided" down the fault tree 302 by the results. Thus, parts of the fault tree 302 are omitted if the information from the fault recognition module 30 did not find suitable conditions warranting further tests in those areas of the fault tree 302. Advantageously, this approach not only reduces the apparent complexity of a large fault tree 302 with many fault branches to a single fault branch (e.g. branch 334), but also ensures fast, accurate traversal of the fault tree 302. Past systems examined many fault possibilities to narrow down a problem. The present invention narrows down the fault possibilities based upon the analysis of machine 80 data by fault recognition module 30. The present invention also ensures consistency in diagnosing a fault or potential fault, because the initial filtering of the information in the machine log files 165 is consistent, thus making the traversal of the fault tree 302 consistent. Accordingly, two operators of varying experience and ability will be able to reach the same basic portion of the fault tree 302, thus producing consistent diagnosis and reducing training costs. Prior to this invention, the guidance down the fault tree 302 was a manual process, which was prone to operator error and misjudgment. With the present invention, a service call can be either completely avoided, or limited to a set of possible root causes identified prior to a customer service representative being dispatched to repair a machine.

The above presents various principles and features of the invention through descriptions of various embodiments. It is understood that skilled artisans can make various changes and modifications to the embodiments without departing from the spirit and scope of this invention, which is defined by the following claims.

To illustrate, the above discussion is couched in terms of a computer network environment with machine 80 separate from diagnostic system 10. It should be realized that machine 80 and diagnostic system 10 can be housed in a single unit.

To give another illustration, several other modules can be included in diagnostic system 10, such as a control task module 190. The control task module 190 can function to determine when to establish a data connection with machine 80, or with several other machines. The control task module 190 can also function to schedule dates and times to access log files.

To give still another illustration, fault recognition module 30 is structured to function as an independent module, so that adaptation to other machines types and expert systems can take place without losing the ability to analyze machine data and guide the traversal of a fault tree.

To give yet another illustration, the ability to mix and match different preprocessors from different machines 80, as specific information providers to the diagnostic system 10 is contemplated. For example, a Pitney Bowes DocuMatch™, references job and specific timing tests within diagnostic system 10. Preprocessors have been defined to examine and report job setup information on how the system was being used when the fault of interest occurred. For example, certain classes of faults are specific to whether the folder module was Z folding or C folding. By parsing this information from the log files 165 on machine 80, and matching it up to the cycle range of the jam patterns that were identified as significant, the folder fault tree can be traversed down the correct branch—either C or Z folding specific errors. Timing slippages can also be checked, by using another preprocessor to provide pass/fail indication to the expert system module 40 in an implementation independent manner.

What is claimed is:

1. A method for diagnosing at least one potential or actual fault in a machine comprising:

analyzing data from the machine to determine a fault indicia for at least one potential or actual fault;

applying said data to a plurality of filters wherein each filter is user configured to recognize a specific error in said machine; and applying the fault indicia to a fault tree having a starting point and being representative of the machine, the fault indicia being applied at a location other than the starting point of the fault tree to determine a diagnostic path within the fault tree.

2. The method of claim 1, wherein the data is in a log data file format.

3. A system for diagnosing at least one potential or actual fault in a machine comprising:

a communications module for communicating machine data between the machine and the system;

a fault recognition module for analyzing the machine data to determine at least one potential or actual faults, said fault recognition model includes a plurality of filters wherein each filter is user configured to recognize a specific error in said machine; and an expert system module having a fault tree with a starting point, where the expert system module is guided through the fault tree at a location other than the starting point of the fault tree by the determination of at least one potential or actual faults by the fault recognition module.

* * * * *